March 5, 1957

M. J. ZUNICK 2,784,284

MOUNTING FOR RESISTOR

Filed Nov. 16, 1954

INVENTOR:–

By:– MICHAEL J. ZUNICK

Junius F. Cook, Jr.

ATTORNEY.

United States Patent Office 2,784,284

Patented Mar. 5, 1957

2,784,284

MOUNTING FOR RESISTOR

Michael J. Zunick, Greenfield, Wis., assignor to General Electric Company, a corporation of New York Application November 16, 1954, Serial No. 469,251

14 Claims. (Cl. 201—63)

The present invention relates in general to mountings for electrical elements, and has more particular reference to improved means for supporting relatively fragile bodies of semi-conducting material, especially bodies of crystalline character, whereby to obtain improved performance and durability of such bodies.

Crystalline semi-conductor elements of the character mentioned are currently in widespread use as photosensitive detectors and for other purposes in electrical translation systems. Hexagonal cadmium sulphide, cadmium selenide and mercury sulphide, for example, are crystalline semi-conductor materials of the sort having impedance characteristics which vary in accordance with the intensity of light radiation impinging thereon, including visible as well as invisible radiation. Germanium, silicon, and numerous other materials have electrical semi-conductor properties and may be utilized as electrical circuit components wherever the semi-conducting properties thereof are required.

Many semi-conductive materials, including cadmium and mercury sulphide and cadmium selenide, are relatively fragile and tend to be sensitive to moisture. As a consequence, where crystals of such materials are used as circuit components in electrical translation systems, it is desirable to provide means for enclosing and supporting the semi-conductive element in a suitable envelope that will not only exclude moisture, but which also will afford mechanical protection for the enclosed element.

Accordingly, an important object of the present invention is to provide a new and improved mounting for the resilient, shockproof support of fragile elements of the character mentioned; a further object being to provide resilient means for supporting the fragile element, whereby the same is buffered against shocks to which it may be subjected in service.

Another important object is to provide a mounting comprising a pair of fine gauge support strips of resilient metal, such as Phosphor bronze, provided with seat forming depressions for resiliently engaging the opposed end portions of a body of fragile material, to thereby support said body on and between said strips; a further object being to mount said strips in spaced apart position on a supporting body of insulating material, whereby said strips may serve to electrically connect the supported element in an associated circuit; a still further object being to mount said strips in spaced relation on a support base of rigid material, whereby a fragile element may be applied between the support strips by flexing the same mutually outwardly and then releasing the same for resilient engagement with oppositely facing portions of the body to be mounted.

Another important object is to form the resilient support strips with oppositely facing depressions in position to seatingly engage oppositely facing portions of a body to be mounted therebetween; a further object being to perforate the strips at said depressions to facilitate the application of electrical conducting cement, such as colloidal graphite, in said seats between the support strips and the seat engaging portions of the supported body.

Another important object is to provide a mounting for a fragile body of the character mentioned, comprising a base, a pair of conductors sealed in and extending through the base, a pair of resilient, fine gauge mounting strips of metal, each electrically and mechanically connected with a corresponding conductor and hence supported in spaced relation on one side of the base in position to resiliently press in opposite directions upon a body of fragile material to be supported therebetween, whereby such body may be mounted between said base supported strips to form an assembly unit; a further object being to form the base of ceramic material, such as glass, and to provide an enclosing shell, as of glass, sealingly secured on said base in position enclosing the strip mounted body within a hermetic envelope comprising said base and shell as envelope components.

Another important object is to provide an exhaust connection on an envelope component whereby the interior of the enclosing envelope may be exhausted or filled with inert gas, and the exhaust connection sealed off after the shell and base components of the envelope have been sealingly interconnected.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings.

Figures 1, 2, 3, 4, 5, 6, 7, 8:
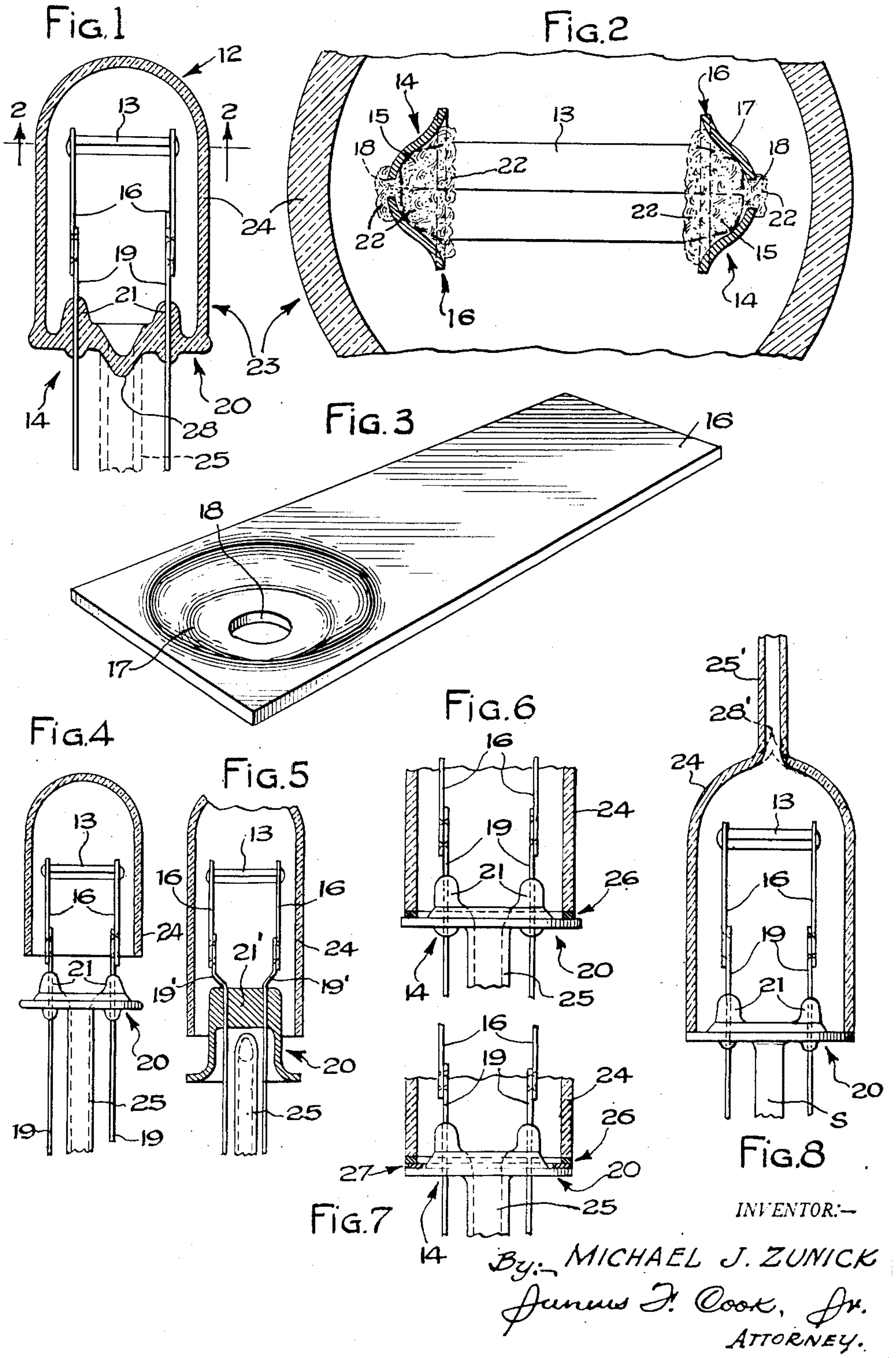
Fig. 1 is a sectional view through a mounting structure embodying the present invention.
Fig. 2 is a large scale sectional view taken substantially along the line 2—2 in Fig. 1.
Fig. 3 is an enlarged perspective view of a mounting member forming a part of the structure shown in Figs. 1 and 2.
Fig. 4 is a sectional view showing the parts of the device of Fig. 1 during the construction thereof.
Fig. 5 is a sectional view showing the component parts of a modified structure during the fabrication thereof.
Figs. 6, 7 and 8 are sectional views illustrating alternate expedients for sealing together the envelope components of the illustrated device.

To illustrate the invention the drawings show a fabricated unit 12 comprising an electrical element 13 and mounting menas 14 for supporting the element and for electrically connecting the same in an electrical circuit in which it may be desired to use the element as a circuit component. The supported element 13 may comprise a body of material providing oppositely facing end portions 15 adapted to be electrically and mechanically engaged with the mounting means 14. While the invention is not necessarily limited to the support of elements of any particular composition or configuration, the herein disclosed mounting is especially well suited for supporting elongated bodies of semi-conducting material, especially if the same be of relatively fragile character. The element 13, accordingly, may comprise a block or body of any suitable or preferred semi-conducting material, such as crystalline cadmium sulphide, cadmium selenide, mercury sulphide, germanium, silicon, or the element 13 may comprise a body of any other material required to be mounted for connection in an electrical circuit.

The mounting means 14 preferably comprises a pair of fine gauge, resilient metal strips 16 which may conveniently be formed of Phosphor bronze, the strips preferably having thickness of the order of 0.005 of an inch. Each strip, as at an end thereof, is formed with a depression 17 providing a seat for interfittingly receiving an end 15 of the element 13, each strip being preferably provided with a perforation 18 which may be conveniently located at the center of the seat forming depression 17. Means is provided for supporting the seat remote ends of a pair of strips 16 in spaced apart relation, to thereby present a pair of said seat forming depressions in facing registration and in such spacement that a body 13, applied in position with its mounting portions 15 interfittingly received in the seat forming depressions 17, will be resiliently pressed in opposite directions by and between the seat forming portions 17 through the resilient action of the mounting strips 16.

The mounting strips 16 may be supported, at the seat remote ends thereof, as by spot welding the same on support stems 19 which, as shown, may comprise wires of electrical conducting material, such as metal of a sort adapted to be sealed with glass. The stem forming wires 19, accordingly, may be supported in spaced relation on a mounting base 20, which may comprise a disk of insulating material providing mountings 21 for supporting the stem forming wires in desired spaced relation.

The base 20 with stems 19 and attached mounting strips 16 may be prefabricated as a unit. The spacement of the strips 16 may then be adjusted to the dimensions of a particular element 13 to be mounted therebetween, as by bending the strip connected portions of the stems 19. A dab or blob of cementitious material 22, preferably of electrical conducting character such as colloidal graphite, may then be applied in each of the seats 17. The strips 16 may thereupon be separated sufficiently to permit the mounting portions 15 of the element 13 to be applied in the cement containing depressions 17. Upon releasing the strips 16, the resilience thereof will cause the seat forming portions 17 to press gently upon the oppositely facing mounting portions 15 of the element 13, to thereby secure the element in mounted position on and between the strips 16. Such pressure may also cause the cementitious material 22 to be squeezed around the mounting portions 15 of the element 13 and within the mounting seats of the strips 16, to thereby mechanically and electrically connect the mounted element with the mounting strips 16, excess cement being squeezed outwardly through the openings 18. The strips 16, because of the inherent resilience thereof, form a shockproof mounting for the supported element 13 which is carried floatingly on the base 20 and hence buffered against mechanical shocks to which the mounting may be exposed.

The cementitious material 22 may comprise colloidal graphite, such as Dag Dispersion Graphite No. 154, or a conductive material, such as Du Pont Silver Paste No. 4922, or other preferred electrically conductive paste may be employed to cement the element 13 in the seat forming depressions 17. Alternately, the mounting portions 15 of the element may be metalized and low temperature lead-tin alloy solders may be used to mount the element 13 in the supporting seats. The alloys of indium with lead and tin may also be used for soldering the mounting portions 15 of the element in the seat forming depressions 17; and where such indium alloy solder is used, the mounting portions 15 need not be metalized since such solder has the property of wetting crystalline material, such as the sulphides of cadmium and mercury, and the selenide of cadmium.

Where the mounted element 13 comprises material sensitive to moisture or other atmospheric contaminants, it may be desirable to provide for sealing the element 13 against atmospheric contaminants, including moisture. To this end, the mounted element 13 and the ends of the members 16 connected therewith may be dipped in a suitable moisture and dirt excluding coating material, such as silicone varnish or other suitable resinous material; in fact, the entire sub-assembly, including the base 20, stems 19 and mounting strips 16, in addition to the mounted element 13 may be coated with moisture excluding resin, if desired.

The mounting means 14 with an element 13 supported therein may form a complete component which may be put to use by electrically connecting the stems 19 in an electrical circuit. It is preferable, however, to enclose the mounted element 13 on the base 20 in a hermetically sealed housing 23, comprising the base 20 and a shell 24 sealed on the base in position enclosing the element 13 and its supporting members 16. To this end, the base 20 and shell 24 may be made of glass. The stem mountings 21 may comprise glass-metal seals, through which the stem forming wires may extend on opposite sides of the base. The base also, preferably centrally thereof, between the mountings 21, may be formed with an exhaust opening, and a hollow tube 25 of glass may be integrally connected with the base in position communicating with said opening, said tube being adapted to serve as a support for the base and the attached strips 16 during the assembly of the element 13 between the strips. Said tube 25 may also serve as a handle for aiding in the manipulation of the assembly unit comprising the base 20, the mounting strips thereon, and the mounted element 13 during the formation of the hermetic housing 23.

The housing 23 may be formed in conventional envelope sealing apparatus by applying the heat of a gas flame to seal the shell 24 on the base 20. To this end, the shell may be applied in the sealing apparatus in position enclosing the mounted element 13, with edges defining an open end of the shell in engagement with the marginal edge portions of the base 20 in position to be peripherally sealed therewith through the conventional operation of the sealing apparatus.

Where both the base 20 and shell 24 are made of lime glass, requiring a working temperature of the order of 1000° C. to seal the envelope, it is desirable to apply the structure in inverted position in the envelope sealing apparatus in order that the mounted element 13 may be substantially below the level of the envelope sealing zone and hence isolated from the heat of the gas flame applied to the envelope to seal the same. Alternately, as shown more particularly in Fig. 6 of the drawings, a solder glass ring 26 may be interposed between the edges of the shell and base to be sealed. The ring 26 may be made of Corning No. 7570 glass, or similar material having a working temperature of the order of 550° C. so that the enevelope may be sealed at relatively low temperature.

Another method of sealing the envelope is illustrated in Fig. 7, wherein a chrome iron ring 27, of material such as Sealmet No. 4 alloy, is pressed into the edge of the glass base 20 during the manufacture thereof, a solder ring 26 being applied between the edges of the base and shell to be joined immediately adjacent the ring 27. Thereupon, the ring 27 may be heated inductively to fuse the adjacent glass envelope portions and thereby accomplish the sealing of the envelope.

The base 20 and envelope forming shell 24 may be of any suitable or convenient form. Preferably, the shell 24 comprises a tubular member open at one end and closed at the other to form a rounded dome, as of hemispherical configuration, the dome remote end of the shell forming an edge adapted to be sealed to the base member 20. As shown more particularly in Figs. 1, 4, 6 and 7, the base member 20 may comprise a relatively flat disk, as of pressed glass, formed with spaced stem mountings 21 and an exhaust opening between the mountings in communication with the tubular support member 25. Alternately, as illustrated in Fig. 5 of the drawings, the base 20 may comprise an inverted cup-shaped member, as of glass, having a peripheral outstanding lip in position to be sealed with the shell 24, said member having a portion 21' forming a mounting for the support stems 19' which extend through and on opposite sides of said portion 21' forming glass-metal seals therewith. An exhaust opening may be formed through the cup-shaped member on one side thereof for connection with a tubular exhaust pipe 25.

As shown in Fig. 8 of the drawings, the base member 20 need not be formed with an exhaust opening, in which case an exhaust opening may be provided in the shell 24, as at the apexial portions of its closed, domelike end, said opening communicating with an exhaust tube 25' connected in preferably integral fashion on the shell 24. Where the base member 20 is formed without an exhaust opening, it may be provided with a support stem S to facilitate the manipulation of the base member during the mounting of the element 13 and the formation of the envelope 23.

After the base and shell members 20 and 24 shall have been sealingly interconnected, the hermetic casing formed by said shell and base members may be closed by sealing off the tube 25, 25', preferably closely adjacent the connection thereof with the hermetic envelope, as shown at 28, 28', such sealing being preferably accomplished after the envelope has been exhausted to a desired extent, as by connection of the pipe 25 or 25' with a suitable exhaust pump. If desired, the envelope 23 may be exhausted and then filled with a suitable inert gas, such as nitrogen, and then sealed.

The present invention, however, is not necessarily limited to the establishment of vacuum conditions within the sealed envelope 23, since the envelope, if desired, may be sealed at atmospheric pressure merely to exclude foreign matter, including moisture, from reaching the mounted element 13 within the envelope, exhaustion of the envelope being merely to eliminate any excess moisture that may be contained within the envelope when the same is sealed.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. An electrical circuit component comprising a body of material forming an electrical element having spaced mounting portions, a pair of blades of electrical conducting material having a depressed socket forming portion, a base of insulating material having stems of electrical conducting material sealed therein and extending on opposite sides thereof, said blades being mechanically and electrically connected on said stems on one side of said base and thus supported in position presenting said socket forming portions in facing relationship to supportingly receive the mounting portions of said body in the socket forming portions of the blades.

2. An electrical circuit component comprising a body of material forming an electrical element having spaced mounting portions, a pair of blades of electrical conducting material each having a depressed socket forming portion, a base of insulating material, means for supporting said blades in spaced relation on said base in position presenting the socket forming portions in facing relationship to supportingly receive the mounting portions of said body in the socket forming portions of the blades, means sealed on said base and forming therewith an hermetic housing enclosing the blades and the body supported thereon at said socket forming portions, said housing being at sub-atmospheric pressure.

3. An electrical circuit component comprising a body of material forming an electrical element having spaced mounting portions, a pair of blades of electrical conducting material each having a depressed socket forming portion, a base of insulating material, means for supporting said blades in spaced relation on said base in position presenting the socket forming portions in facing relationship to supportingly receive the mounting portions of said body in the socket forming portions of the blades, means sealed on said base and forming therewith an hermetic housing enclosing the blades and the body supported thereon at said socket forming portions, said housing containing an inert gas enveloping the blades and the element supported therebetween.

4. An electrical circuit component comprising an elongated body of relatively fragile crystalline material, such as cadmium or mercury sulphide or cadmium selenide, forming an electrical element having opposed ends forming spaced mounting portions, a pair of resilient metal blades each having a socket forming portion for receiving a corresponding mounting portion of said body, and means for supporting said blades in spaced relation presenting said socket forming portions in position to press yieldingly in opposite directions upon said mounting portions of the body to resiliently support the same in shockproof fashion on and between the socket forming portions of said blades.

5. An electrical circuit component as set forth in claim 4 wherein a said blade comprises a strip of metal formed with a dished depression providing the socket forming portion of the strip.

6. An electrical circuit component as set forth in claim 4 wherein a said blade comprises a strip of metal having thickness of the order of five mils and formed with a dished depression providing the socket forming portion of the strip.

7. An electrical circuit component as set forth in claim 4 wherein a said blade comprises a strip of resilient Phosphor bronze metal having thickness of the order of five mils.

8. An electrical circuit component as set forth in claim 4 and including an electrical conducting medium disposed in the socket forming portion of a said blade in position electrically connecting a mounting portion of said body with a said blade at the socket forming portion thereof.

9. An electrical circuit component as set forth in claim 4 and including an electrical conducting medium comprising colloidal graphite, said medium being disposed in a socket forming portion of a said blade in position electrically connecting a mounting portion of said body with the blade at the socket forming portion thereof.

10. An electrical circuit component as set forth in claim 4 and including an electrical conducting medium comprising silver dust in a cement forming binder, said medium being disposed in a socket forming portion of a said blade in position electrically connecting a mounting portion of said body with the blade at the socket forming portion thereof.

11. An electrical circuit component as set forth in claim 4 and including an electrical conducting medium comprising a comminuted electrical conducting material in a cement forming binder, said medium being disposed in a socket forming portion of a said blade in position electrically connecting a mounting portion of said body with the blade at the socket forming portion thereof.

12. An electrical circuit component as set forth in claim 4 and including an electrical conducting medium comprising the alloy of lead and tin as a solder, said medium being disposed in a socket forming portion of a said blade in position electrically connecting a mounting portion of said body with the blade at the socket forming portion thereof.

13. An electrical circuit component as set forth in claim 4 and including an electrical conducting medium comprising the alloy of indium with lead and tin as a solder, said medium being disposed in a socket forming portion of a said blade in position electrically connecting a mounting portion of said body with the blade at the socket forming portion thereof.

14. An electrical circuit component as set forth in claim 4 wherein a said blade comprises a strip of metal formed with a dished depression providing the socket forming portion of the strip, the strip being formed with a perforation therethrough for the accommodation of excess quantities of cementitious paste applied to connect a said mounting portion of the electrical element with the blade at the socket forming portion.

References Cited in the file of this patent

UNITED STATES PATENTS

| | | |
|---|---|---|
| 1,483,629 | Ruttenberg et al. | Feb. 12, 1924 |
| 1,804,344 | Jones | May 5, 1931 |
| 2,163,409 | Pulfrich | June 20, 1939 |
| 2,176,604 | Benkelman | Oct. 17, 1939 |
| 2,587,674 | Aiken | Mar. 4, 1952 |